United States Patent [19]
Burt et al.

[11] 3,944,540
[45] Mar. 16, 1976

[54] PRECIPITATION OF ORGANIC DYES AND DYE INTERMEDIATES IN THE PRESENCE OF FINELY DIVIDED POLYTETRAFLUOROETHYLENE

[75] Inventors: Gerald D. Burt, Shaker Heights; Anton Mudrak, Broadview Heights, both of Ohio

[73] Assignee: The Harshaw Chemical Company, Cleveland, Ohio

[22] Filed: Dec. 17, 1973

[21] Appl. No.: 425,064

[52] U.S. Cl. ............... 260/186; 260/180; 260/205; 260/206; 260/207; 260/207.1; 260/208; 260/379; 260/562 A; 260/575; 260/591

[51] Int. Cl.$^2$ ............... C07C 107/06; C09B 11/22; C09B 29/00; C09B 31/02

[58] Field of Search ........ 260/208, 186, 205, 207.1, 260/206, 207, 566, 369, 371, 372, 582, 575

[56] References Cited
UNITED STATES PATENTS

| | | | |
|---|---|---|---|
| 2,687,410 | 8/1954 | Hanke | 260/204 |
| 3,016,384 | 1/1962 | Caliezi | 260/314.5 |
| 3,071,815 | 1/1963 | MacKinnon | 260/208 X |
| 3,356,443 | 12/1967 | Dziomba | 260/208 X |
| 3,755,291 | 8/1973 | Demler et al. | 260/200 |

OTHER PUBLICATIONS

Kirk–Othner, "Encyclopedia of Chemical Technology," Vol. 6, pp. 486–488 (1965).
Kuznetsov et al., Chemical Abstracts, Vol. 71, p. 331, Item No. 7238h (1969).

*Primary Examiner*—Floyd D. Higel
*Attorney, Agent, or Firm*—Alfred D. Lobo

[57] ABSTRACT

Organic dyes or dye intermediates are crystallizable in an aqueous medium in the presence of finely divided, solid polytetrafluoroethylene (hereinafter referred to as "PTFE") resin particles. Crystals of desirable, very small size are precipitated more quickly than with conventional seeding. This process is particularly useful for crystallizing disperse dyes of two types:

1. azo dyes formed by coupling a diazonium salt with a substituted aromatic amine, and
2. anthraquinone dyes formed by condensing a nitroanthraquinone compound with an aromatic amine.

3 Claims, No Drawings

PRECIPITATION OF ORGANIC DYES AND DYE INTERMEDIATES IN THE PRESENCE OF FINELY DIVIDED POLYTETRAFLUOROETHYLENE

BACKGROUND OF THE INVENTION

It is well known that many organic dyestuffs and dye intermediates precipitate from solution as amorphous solids, gums, or tars, rather than in crystalline form. In such cases it is often necessary to induce crystallization of the compound or to inhibit formation of the gummy or tarry product. With difficulty crystallizable compounds, it is sometimes necessary to resort to a combination of treatments including seeding with particles, mechanical agitation and shock. Routinely, an azo dyestuff may be extracted with a solvent which does not appreciably dissolve the crystallizand but which may dissolve out certain impurities, give an interface effect or cause polymorphic transformation. Treatment may include digestion with boiling solvent under reflux or extraction in a Soxhlet type apparatus followed by appropriate supercooling, or in long shaking with the poor solvent in the cold. Sometimes contact with the poor solvent for several days at room temperature is effective. Alternatively the solution may be subjected to a rubbing or shaking action for several hours. Crystallization sets in, probably due to the formation of nuclei. Typically bentonite, kieselguhr, silica gel or charcoal may be added to aid crystallization.

The manner in which a dyestuff is formed and the refining process by which the product formed is crystallized and purified may result in the product having varied physical properties. Variations in physical properties can render a dye crystallized by one procedure excellent for a specific use and the same dye crystallized in another manner, far less satisfactory for the purpose.

Disperse azo dyes are formed directly from water-soluble reactants which result in an essentially water-insoluble dye. The anthraquinone dyes are formed in an organic solvent in which the dye may be soluble. Where the dye is soluble in the organic solvent, the reaction mass is 'drowned' in a liquid medium in which the dye is insoluble, such as in water, a salt solution or an acid solution. The specific composition of the liquid medium is not as important as its properties, which are that the liquid medium be miscible with the solvent and that the solute be relatively insoluble in it.

However, before crystals can grow, it is known that there must exist in the solution a number of minute bodies called "centers of crystallization" or "nuclei", but how a crystal nucleus is formed is not known with any degree of certainty. Different systems require different degrees of supersolubility or super-cooling before nucleation will occur, and often the conditions required by one particular system vary according to its state.

Probably the best method for inducing crystallization is to inoculate or seed the supersaturated solution with small regular-sized particles consisting of the material to be crystallized. The seeds should be dispersed uniformly throughout the solution by means of gentle agitation. (Chemical Engineering Practice, Cremer & David, Vol. 6 pg. 405). In the instant invention, the solution is seeded with inert particles of a water-wettable polytetrafluoroethylene resin, which unexpectedly gives better results than seeding with particles of material to be crystallized. Seeding with inert particles effectively nucleates the solution to yield a dye in which the resin is occluded, and at the same time, obviates the time-consuming process steps conventionally utilized to induce crystallization of organic dyestuffs and dye intermediates which crystallize with difficulty.

SUMMARY OF THE INVENTION

It has been discovered that solutions of organic dyes and dye intermediates which crystallize with difficulty, if at all, may be induced to crystallize as fine crystals in the presence of finely divided solid PTFE particles present in an aqueous phase.

It is therefore a general object of this invention to provide a new and improved process for crystallizing organic dye and dye intermediates which are not easily crystallized.

More particularly, it has been discovered that disperse dyes and disperse dye intermediates may be crystallized as a reaction product in the presence of finely divided water-wettable particles of PTFE resin, more easily than they can be crystallized without the use of these particles. In many instances, crystals of azo and anthraquinone dyes may be precipitated in the presence of PTFE particles more easily, and exhibit better quality, than if the crystals are precipitated by seeding in any known manner.

It is therefore another general object of this invention to provide a process for crystallizing an organic disperse dye or disperse dye intermediate in the presence of water and microscopic, solid, water-wettable particles of PTFE resin.

It is also another general object of this invention to provide an organic disperse dye in finely divided crystalline form or in a crystalline form which may subsequently be more easily mechanically comminuted, having occluded in each of the majority of the crystals precipitated, at least one particle of a water-wettable polytetrafluoroethylene resin which is essentially inert with respect to the dyestuff and the solvent from which it is crystallized.

It is a specific object of this invention to provide a process which will accelerate the crystallization from solution of difficultly crystallizable organic dyestuffs and dye intermediates.

It is a more specific object of this invention to provide a disperse azo dye, disperse anthraquinone dye, or their dye intermediates nucleated with finely divided water-wettable particles of PTFE resin at least one of which particles remains occluded within each of a majority of crystals of the disperse dye or intermediate without substantially affecting the desirable properties of the crystals.

It is still another specific object of this invention to provide crystals of a disperse dye, in the majority of which at least one PTFE particle is occluded, which crystals may be subsequently mechanically comminuted to micron or submicron size with a substantially lessened dusting problem.

These and other objects, features and advantages of this process and the crystals grown thereby, will become apparent to those skilled in the art from the following description of preferred forms thereof and the examples set forth herein.

DETAILED DESCRIPTION OF PREFERRED EMBODIMENTS OF THIS INVENTION

According to the process of this invention, an organic dye or dye intermediate may be crystallized from solution in the presence of water-wettable, finely divided particles of PTFE resin such as are present in an aqueous colloidal dispersion of PTFE. The process is particularly applicable to precipitating crystals of difficulty crystallizable organic dyes and intermediates which are insoluble or difficultly soluble in water.

It also has particular utility for crystallizing a reaction product held in solution in a non-aqueous medium, whether or not the non-aqueous medium is soluble in water. The process is most conveniently used in those instances where the reaction product is an organic dye which is soluble in a non-aqueous medium but insoluble in water, and the non-aqueous medium is compatible or miscible with water to a sufficient extent to permit the dye to be precipitated from solution. Though, hereinafter reference will be made to a 'dye' it will be understood that intermediates of the 'dye' may also be similarly treated. Generally, since intermediates are relatively easily crystallizable, since they are comparatively simpler compounds and have relatively low molecular weights, this process is less likely to have as great value as in the production of dyes. However, it may be used, even where crystals are relatively easily obtained, with conventional seeding, in those instances where particular properties, such as smaller and more uniform crystal size, are desirable, and these properties are obtained by seeding with PTFE particles.

In each embodiment of the instant invention, only finely-divided water-wettable PTFE resin particles are used, such as water-wettable fibrillatable PTFE in the form of finely divided, solid particles commercially available as a colloidal aqueous suspensoid or dispersion concentrated to about 60% by weight of polymer, having particles about 0.05 to about 0.5 micron in size, with average diameters of about 0.2 micron. U.S. Pat. No. 2,559,752 discloses a process for forming an aqueous dispersion of colloidal water-wettable particles of PTFE resin. Another type of fibrillatable PTFE generally referred to as "fine powder", obtained by coagulation of the dispersion, is less effective as a seeding agent because it is not water-wettable. A notable fact is that addition of an aqueous dispersion of colloidal PTFE particles to an organic solvent which is water-immiscible, results in agglomeration of the PTFE particles on the surface, and provides no benefit relative to crystallization. Most notably, finely divided forms of other particulate polyhalocarbons and polyolefins are ineffective as seeding agents to effect the quicker precipitation of crystals of organic dyestuffs or dye intermediates, as compared with precipitation in a conventional manner.

Particular embodiments of the invention described herein are directed to disperse dyes which include colors of the azo, azomethine, nitroarene and anthraquinone chemical classes. Disperse dyes account for almost all the dyeing of cellulose acetate and polyethylene terephthalate textile fibers. They are also used in dyeing nylon, where the uniform coloration of the fiber is of value. Disperse dyes, in common, show insignificant water solubility and must be finely divided as they are known to dye the fiber by a mechanism involving a very dilute dispersion in water as an intermediate step, followed by solution in the fiber. Especially important are the disperse azo and anthraquinone dyes. Among the disperse azo dyes, this process is particularly useful for precipitation of monoazo and disazo reaction products; among the anthraquinones, the more complex derivatives of the aminoanthraquinones are more difficultly crystallizable and therefore can profitably utilize this process.

Though some dyes precipitate from solution when seeded with PTFE particles much faster than with bentonite (say) it is not presently known how to predict the improvement in rate, or the factors which influence such improvement. Best results are generally obtained with water-wettable fibrillatable PTFE resin particles. Less surprising, but useful results are obtained with water-wettable finely divided suspensoids of polymeric fluorinated ethylene propylene resins.

Crystals precipitated from solution in the presence of PTFE particles are not only obtained more easily but are generally smaller in particle size than those obtained by conventional seeding. Again, quite unexpectedly, the amount of seed particles of PTFE required to obtain quicker precipitation is less than the amount of foreign conventional seed particles used, and, less than the amount of seed particles of the same material normally used.

Even where relatively large crystals, in the range from about 50 microns to about 150 microns, are precipitated from solution, it is found that the crystals may be ground, more easily, than conventionally seeded crystals, in commonly used comminuting equipment such as top feed mills.

Seeding difficultly crystallizable disperse dyes with PTFE particles results in no noticeable detrimental effects in the dyeing properties of the disperse dyes obtained, and they may be treated in the usual manner with dispersing agents commonly used in their application.

The following examples are only illustrative of the invention, it being understood that numerous other dyes and dye intermediates may be crystallized in an analogous manner. All 'parts' referred to are parts by weight, unless specified otherwise.

EXAMPLE 1

A. A monoazo disperse dye represented by the structural formula:

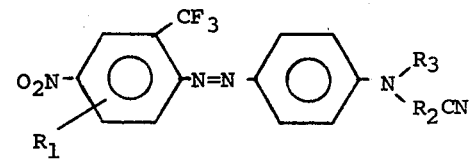

wherein $R_1$ is a halogen,
$R_2$ is alkylene having from 1 to 4 carbon atoms, and,
$R_3$ is lower alkyl having 1 to 5 carbon atoms,
is prepared by coupling an appropriate halogen-containing diazonium salt with an equimolar ratio of a substituted aromatic amine in an aqueous medium in a known manner under conventional conditions. The resultant azo dye "tarred out", that is, resulted in a tarry or gum-like substance, and did not precipitate as a solid. Methanol treatment, that is, redissolving the tarred-out dye in methanol and reprecipitation in cold water, is required to obtain a solid press cake.

B. The same reaction as described in part A hereinabove is carried out under the same conventional conditions, except that 1 per cent by weight, based on the theoretical yield of dye, of a 60% dispersion of PTFE resin (commercially available as T-30*Teflon) (*Trademark of Dupont Co.), is added to the solution of the coupling component before the solution of diazonium salt is added. Solid dye precipitates essentially immediately in finely divided crystals. The size of individual crystals is in the range from about 30 μ to about 105 μ and the mass may be conveniently filtered. Agglomerates of crystals are also obtained which are easily broken up by grinding in a top-feed mill with suitable dispersing agents, etc., such as are conventionally used to prepare a dye for use.

The crystals so obtained are unique in that the majority of individual crystals have occluded therewithin at least one primary particle of PTFE. This is evidenced by dissolving a mass of the crystals in a suitable solvent and recovering the PTFE particles from the solution. Before the crystals are dissolved there is no visible trace of the presence of PTFE particles. Crystals formed by utilizing PTFE particles as nuclei are remarkable in that they are generally smaller and geometrically better defined than crystals of the same dyes or intermediates nucleated conventionally. Moreover, when ground in a top-feed mill or the like, crystals of this invention are surprisingly less dusty and generally require less time to be ground to a predetermined size, as compared to conventionally obtained crystals.

As has been stated hereinabove, this invention has particular merit in the production of difficultly crystallizable dyes and intermediates; but it is also useful with relatively easily crystallizable organic compounds in which small crystal size, easy grinding and a much reduced proclivity to dust when ground, are desirable.

EXAMPLE 2

A. A monoazo disperse dye represented by the structural formula;

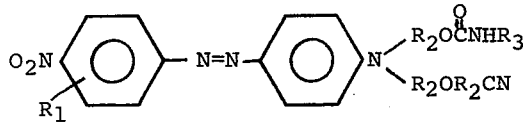

wherein $R_1$, $R_2$ and $R_3$ have the same connotation as in Example 1 hereinabove, is prepared by coupling an appropriate halogen-containing diazonium salt with an equimolar ratio of a substituted aromatic amine, in an aqueous medium, in a conventional manner. The dye tarred-out and did not solidify even on a prolonged standing. Methanol treatment is required to obtain a solid press cake.

B. The same reaction as described in part A hereinabove is carried out under the same conventional conditions, except that 1 per cent by weight of solids, based on the theoretical yield of dye, of a 60% dispersion of PTFE resin (commercially available As T-30*Teflon) (*Trademark), is added to the solution of the coupling component before the solution of diazonium salt is added. Solid dye is precipitated in a tarry form which crystallizes after standing for about two days. The size of individual crystals is in the range from about 30 μ to about 105 μ. Agglomerates of crystals are also obtained. Though crystal formation is slow, crystals formed are small, being less than about 125 μ in size. Of equal importance is that a methanol treatment is sidestepped.

EXAMPLE 3

A. A monoazo disperse dye represented by the structural formula:

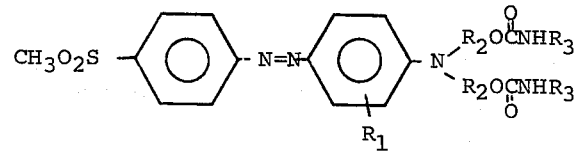

wherein $R_1$, $R_2$ and $R_3$ have the same connotation as in example 1 hereinabove, is prepared by coupling an appropriate diazonium salt with an equimolar ratio of halogen-containing aromatic amine, in an aqueous medium, in a conventional manner. The dye tarred out forming "blobs" of such viscosity that stirring had to be discontinued.

B. The same reaction as described in part A hereinabove is carried out under the same conventional conditions, except that 1 per initially, by weight of solids, based on the theoretical yeild of dye, of Bentonite is added to the solution of the coupling component before the solution of diazonium salt is added. Stirring is maintained and at the end of one day a semisolid mass is formed with signs of incipient crystallization.

C. The same reaction as described in part A hereinabove is carried out under the same conventional conditions, except that 1 per cent by weight of solids, based on the theoretical yield of dye, of T-30*Teflon (*Trademark) is added to the solution of the coupling component before the solution of diazonium salt is added. The dye is precipitated as a mass of crystals in less than 1.5 hours. Individual crystals ranged from 30 μ to about 105 μ and agglomerates of crystals are obtained which are easily comminuted.

D. The same reaction as described in part A hereinabove is carried out under the same conventional conditions, except that 1 per cent by weight of solids, based on the theoretical yield of dye, of finely divided pure crystals of the same dye to be precipitated (obtained from a previous preparation) is added to the solution of the coupling component before the solution of diazonium salt is added. Solid dye precipitated after 5 hours of constant stirring. Individual crystals were generally larger than those obtained in part C immediately hereinabove, and agglomerates of crystals are more difficult to grind into fine powder.

EXAMPLE 4

A. A disazo disperse dye represented by the structural formula:

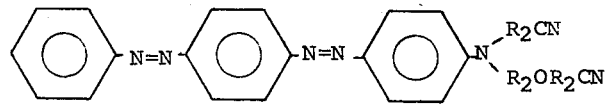

wherein $R_2$ is a lower alkylene having from 1 to 5 carbon atoms is prepared by coupling aminozao benzene in equimolar ratio with an amine represented by the structural formula:

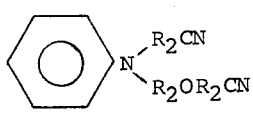

wherein R₂ is the same as above, in a known manner, under conventional conditions. The resultant disazodye is formed as a tar, intitially, but hardens on stirring overnight. No crystals are observed to be formed.

B. The same reaction as described in part A hereinabove is carried out under the same conventional conditions, except that 1 per cent by weight of solids, based on the theoretical yield of dye, of a 60% dispersion of PTFE resin (commercially available as T-30*Teflon) (*Trademark), is added to the solution of the dinitrile

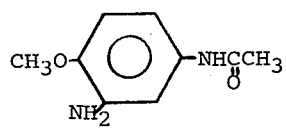 + 2 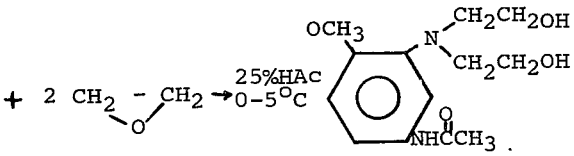

prior to the addition of the diazotized aminoazo benzene. Solid dye precipitates essentially immediately in finely divided crystalline form, without the formation of tarry product. As in prior examples, hereinbefore, the crystals obtained are found to have PTFE particles occluded herein.

EXAMPLE 5

A. An anthraquinone disperse dye represented by the structural formula:

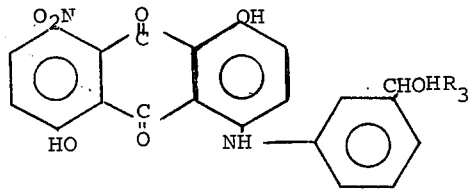

wherein $R_3$ has the same connotation as in Example 1 hereinabove, is prepared by condensing a mixture of dihydroxy-dinitro isomers of 1,8-dihydroxy-1, 5-dinitro-anthraquinone with a substituted aniline represented by the structural formula:

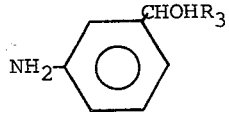

in a Cellosolve solvent in a known manner and under conventional conditions. After completion of the reaction, the reaction mixture is cooled and poured slowly, with stirring, into 2 N HCl to precipitate crystals of the dye. But the dye does not readily precipitate in crystalline form.

B. The same reaction as described in part A hereinabove is carried out under the same conventional conditions, except that 1 per cent by weight of solids, based on the theoretical yield of dye, of a 60% dispersion of PTFE resin (commercially available as T-30*Teflon) (*Trademark), is added to the 2 N HCl solution prior to drowning the batch. The anthraquinone dye is readily precipitated in crystalline form with a primary crystal particle size in the range from about 30 μ to about 125 μ. Agglomerates of crystals are easily ground as are the primary crystals themeslves.

EXAMPLE 6

A. An alkoxylated intermediate, useful as a coupling component in a monoazo disperse dye, may be prepared conventionally, for example, by ethoxylating 2-methoxy-5-acetamino aniline in acetic acid at about 0°–5°c. Sufficient ethylene oxide is added until the diazo test is negative. The product obtained, after excess acetic acid is driven off, is an oily mass. This oily mass is repeatedly washed with diethyl ether before a crystalline product is obtained. The reaction may be set forth as follows:

The crystalline coupling component may then be coupled with a diazotized dinitrochloroaniline to yield a difficulty crystallizable disperse dye, in a known manner. The dye may thereafter be acetylated as disclosed in U.S. Pat. No. 3,179,405.

B. The same sequence of reactions set forth in part A immediately hereinabove is carried out under the same conditions except that about 1% by weight of PTFE resin solids present as an aqueous colloidal dispersion of T-30 Telfon resin, is added to the reaction mass containing 2-methoxy-5-acetamino aniline. Instead of an oily reaction product, a crystalline product is obtained.

Alternatively, the PTFE solids may be added in subsequent steps only, but it will be apparent that greatest benefit of the nucleating PTFE solids will be had with an early addition. It may be preferred to add additional PTFE solids to each step to obtain enhanced crystallization, both with respect to speed of crystallization and uniformity of small geometrically well-defined crystals.

EXAMPLE 7

A. An amine intermediate, such as is commonly used to prepare an authraquinone dye, is represented by the structural formula:

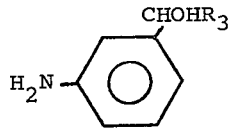

wherein $R_3$ is lower alkyl having from 1 to 5 carbon atoms, is conventionally prepared in the following manner: an acylphenone is nitrated in mixed acid to form nitroacylphenone. The nitroacetophenone is reduced either catalytically under pressure, or in a Meerwein-Ponndorf reaction to yield the nitrophenyl alkyl carbinol. The carbinol obtained is then reduced with iron powder to form the amine. In the foregoing conventional preparation both the carbinol and amine are obtained as oily products, so termed because they are less viscous and less dense than a tar or gum formed in other examples referred to herein.

B. The same sequence of reactions set forth in part A immediately hereinabove is carried out under the same conditions except that about 1% by weight of PTFE resin solids present as an aqueous colloidal dispersion of T-30 Teflon resin, is added to the reaction mass containing nitroacylphenone. Instead of an oily product, a crystalline, nitrophenyl alkyl carbinol is obtained. The crystalline product is easier to work with and allows physical characteristics, which may be indicative of the quality of the product, to be readily observed.

Alternatively, the PTFE solids may be added in the subsequent reduction step, which as stated hereinabove, conventionally yields a difficultly crystallizable amine. In the presence of finely divided PTFE a crystalline amine is produced which is easily recovered and handled.

Where the PTFE resin is added in a prior reaction, to obtain a crystalline reaction product with PTFE particles occluded in the crystals, the subsequent processing of the product is facilitated due to the presence of PTFE solids. For example, if PTFE solids are added in the Meerwein-Ponndorf reaction, and the crystals so obtained used in the subsequent reduction to the amine, improved crystallization is noted though no additional PTFE is added.

In the foregoing examples about 1% by weight PTFE solids, based on the theoretical reaction yield of solids, is used. It will be apparent that there is nothing critical about the amount of PTFE solids used for nucleation provided there are sufficient nucleating solids present to effect the desired improved crystallization. From the submicron primary particle size of PTFE solids in a typical suspensoid of water-wettable particles it will be apparent that even trace amounts of PTFE in the range of about 50 parts per million (on a weight basis) may provide noticeable improvement in crystallization. Generally, however, it will be found that an amount in the range from about 0.1 percent to about 3 percent by weight, based on theoretical yield of solids, will suffice. Even larger amounts may be used, but such large amounts provide no additional benefit, and serve only to introduce a significant amount of inert solids into the dye.

Best results are obtained with water-wettable PTFE which is used herein to illustrate the invention. Other water-wettable fully halogenated polyhaloolefinic resins in finely divided, submicron or micron, particle sizes may also be used. By the term "fully halogenated" is meant that all substitutable hydrogen atoms in a polyolefinic resin have been substituted with halogen, preferably selected from fluorine and chlorine.

Modifications, changes, and improvements to the preferred forms of the invention herein disclosed, described and illustrated may occur to those skilled in the art who come to understand the principles of its operation and the function of finely divided polyhaloolefinic resins as nucleating agents. Accordingly, the scope of the patent to be issued herein should not be limited to the particular embodiment of the invention set forth herein, but rather should be limited by the advance by which the process and the organic crystals formed thereby has promoted the art of obtaining the crystals from solutions containing them.

We claim:

1. A process for crystallizing an organic essentially water-insoluble disperse dye or disperse dye intermediate comprising forming a water-insoluble dye or dye intermediate, in the presence of a water-wettable, finely divided, particulate polytetrafluoroethylene resin having an average primary particle size less than the average size of crystals to be deposited and crystallizing said dye or dye intermediate as a mass of crystals having an average diameter less than about 150 microns.

2. The process of claim 1 wherein said disperse dye is selected from the azo, azomethine, nitroarene and anthraquinone chemical classes.

3. A process for crystallizing an organic water-insoluble disperse dye or dye intermediate comprising dispersing in a liquid reaction mass containing a diazonium salt and an aromatic amine or other coupling component, a sufficient amount of water-wettable, finely divided polytetrafluoroethylene resin, having an average primary particle size in the range from about 0.02 micron to about 0.5 micron, to seed said liquid reaction mass, and, crystallizing said dye or dye intermediate as a mass of crystals having an average size less than about 150 microns, by providing each of the majority of said crystals with at least one particle of said finely divided water-wettable polytetrafluoroethylene resin.

* * * * *